United States Patent
Xie et al.

(10) Patent No.: US 10,192,338 B2
(45) Date of Patent: Jan. 29, 2019

(54) METHOD, DEVICE AND MCU FOR ADJUSTING AND CONTROLLING SUB-PICTURE IN MULTIPLE PICTURES

(71) Applicant: ZTE Corporation, Shenzhen (CN)

(72) Inventors: Lunpeng Xie, Shenzhen (CN); Fu Wang, Shenzhen (CN); Xin Tong, Shenzhen (CN); Wuhui Wan, Shenzhen (CN); Haiyan Zhang, Shenzhen (CN); Jingxin Hu, Shenzhen (CN); Lintao Zhang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 15/522,517

(22) PCT Filed: Jul. 1, 2015

(86) PCT No.: PCT/CN2015/083105
§ 371 (c)(1),
(2) Date: Apr. 27, 2017

(87) PCT Pub. No.: WO2016/065918
PCT Pub. Date: May 6, 2016

(65) Prior Publication Data
US 2017/0330359 A1   Nov. 16, 2017

(30) Foreign Application Priority Data
Oct. 27, 2014   (CN) .......................... 2014 1 0584118

(51) Int. Cl.
*G06T 11/60* (2006.01)
*H04N 21/431* (2011.01)
(Continued)

(52) U.S. Cl.
CPC ............ *G06T 11/60* (2013.01); *G06F 3/0488* (2013.01); *H04N 7/152* (2013.01); *H04N 21/431* (2013.01)

(58) Field of Classification Search
CPC ....... G06T 11/60; H04N 21/431; H04N 7/152
(Continued)

(56) References Cited

U.S. PATENT DOCUMENTS

2010/0103245 A1* 4/2010 Decker ................. H04N 7/152
   348/14.09
2010/0333004 A1* 12/2010 Kristiansen ......... G06F 3/04883
   715/765
(Continued)

FOREIGN PATENT DOCUMENTS

CN   101420534 A   4/2009
CN   101959051 A   1/2011
(Continued)

OTHER PUBLICATIONS

International Search Report for corresponding application PCT/CN2015/083105 filed on Jul. 1, 2015; dated Sep. 6, 2015.
(Continued)

*Primary Examiner* — Amandeep Saini
(74) *Attorney, Agent, or Firm* — Cantor Colburn LLP

(57) ABSTRACT

A method, device and multipoint control unit device for adjusting and controlling a sub-picture in multiple pictures are provided. The method includes: acquiring the N original video images sent from a plurality of video terminals, adjusting the resolutions of the N original video images and correspondingly displaying the N resolution-adjusted video images in N regions on the display screen of the multipoint control unit, wherein N is a natural number equal to or greater than 1; performing a resolution increase adjustment processing on the video image in any one of the N regions
(Continued)

to acquire a resolution-increased video image; and cutting, according to the information of the region where the resolution-increased video image is located, the resolution-increased video image to obtain an image which is located in the region where the resolution-increased video image is located after the cutting. According to the solutions provided herein, an image of interest can be increased in resolution and moved in the region where the image of interest is located on the premise of not affecting the video images in the other regions.

7 Claims, 11 Drawing Sheets

(51) Int. Cl.
*G06F 3/0488* (2013.01)
*H04N 7/15* (2006.01)

(58) Field of Classification Search
USPC .......................................................... 382/309
See application file for complete search history.

(56) References Cited

U.S. PATENT DOCUMENTS

| | | |
|---|---|---|
| 2011/0085016 A1 | 4/2011 | Kristiansen et al. |
| 2014/0063178 A1 | 3/2014 | Krans |
| 2014/0125755 A1* | 5/2014 | Thomas ................ H04L 65/403 348/14.03 |

FOREIGN PATENT DOCUMENTS

| | | |
|---|---|---|
| CN | 102842111 A | 12/2012 |
| EP | 2418847 A1 | 2/2012 |

OTHER PUBLICATIONS

Search Report dated Jul. 17, 2017, EP Application No. 15854310.8, 9 pages.

* cited by examiner

METHOD, DEVICE AND MCU FOR ADJUSTING AND CONTROLLING SUB-PICTURE IN MULTIPLE PICTURES

TECHNICAL FIELD

The present disclosure relates to the field of communication technologies, and in particular to a method, device and multipoint control unit (MCU) for adjusting and controlling a sub-picture in multiple pictures and a multipoint control unit.

BACKGROUND

In the multiple pictures displayed in a video conference, an image located at a specific position in a certain sub-picture can only be amplified by remotely controlling the camera of the terminal corresponding to the sub-picture. For example, the camera is first remotely controlled to face a region of interest and then remotely controlled to zoom in or out on the image to realize this amplification, however, amplifying an image in this way has a problem that the image generated by the terminal at each conference site is affected after the camera of the terminal corresponding to a sub-picture is zoomed.

In a video conference, each terminal can define the number of pictures and a terminal permitted to select and watch a single-picture image by itself. Except for these basic operations, existing technologies make no achievements in enabling each conference terminal to control the definition of a sub-picture selected from multiple pictures for watching or to move a region of interest freely.

SUMMARY

The present disclosure is intended to provide methods, devices and MCUs for adjusting and controlling a sub-picture in multiple pictures to address the problem existing in the conventional art that the check of the user of a conference terminal on a picture of interest included in multiple pictures has an influence on the other sub-pictures.

According to one aspect of the present application, a method for adjusting and controlling a sub-picture in multiple pictures is provided in an embodiment of the present invention, which includes: acquiring the N original video images sent from a plurality of video terminals, adjusting the resolutions of the N original video images and correspondingly displaying the N resolution-adjusted video images in N regions on the display screen of a multipoint control unit, wherein N is a natural number equal to or greater than 1; performing a resolution increase adjustment processing on the video image in any one of the N regions to acquire a resolution-increased video image; and cutting, according to the information of the region where the resolution-increased video image is located, the resolution-increased video image to obtain an image which is located in the region where the resolution-increased video image is located after the cutting.

In certain embodiments, the step of adjusting the resolutions of the N original video images includes: performing a sampling processing on the N original video images.

In certain embodiments, the step of performing a resolution increase adjustment processing on the video image in any one of the N regions to acquire a resolution-increased video image includes: acquiring the amplification parameter of the video image in any one of the N regions; and performing a resolution increase adjustment processing on the video image in a corresponding region according to the amplification parameter to obtain a resolution-increased video image.

In certain embodiments, the step of acquiring the amplification parameter of the video image in any one of the N regions includes: acquiring an instruction carrying the information about amplification rate of the video image in a region; and acquiring the amplification parameter of the video image in a corresponding region according to the information about amplification rate in the instruction.

In certain embodiments, the step of acquiring an instruction carrying the information about amplification rate of the video image in a region includes: when a touch and amplify operation on the video image in a region is detected, acquiring an instruction carrying the information about amplification rate of the video image in a corresponding region according to the touch and amplify operation, or when the selection of an option of amplification on the operation menu of the video image in a region is detected, acquiring an instruction carrying the information about amplification rate of the video image in a corresponding region.

In certain embodiments, the step of performing a resolution increase adjustment processing on the video image in a corresponding region according to the amplification parameter to obtain a resolution-increased video image includes: amplifying the video image in a corresponding region according to the amplification parameter to obtain the resolution of the amplified image, wherein the resolution of the amplified image is smaller than that of a corresponding original video image; acquiring the information about lost pixels according to the resolution of the amplified image; and acquiring, according to the information of the lost pixels, the lost pixels from corresponding positions of a pre-stored original video image corresponding to the amplified image so as to acquire a resolution-increased video image.

After the step of acquiring the resolution-increased video image, the method further includes: acquiring the movement track information of the resolution-increased video image; and translating the resolution-increased video image according to the movement track information.

In certain embodiments, the step of acquiring the movement track information of the resolution-increased video image includes: when a touch-and-move operation on the resolution-increased video image is detected, acquiring the movement track information of the resolution-increased video image according to the touch-and-move operation, or when the selection of an option of movement track on the operation menu of the resolution-increased video image is detected, acquiring the movement track information of the resolution-increased video image.

According to another aspect of the present application, a device for adjusting and controlling a sub-picture in multiple pictures is provided in an embodiment of the present disclosure, including: a first acquisition module configured to acquire the N original video images sent from a plurality of video terminals, adjust the resolutions of the N original video images and correspondingly display the N resolution-adjusted video images in N regions on the display screen of a multipoint control unit, wherein N is a natural number equal to or greater than 1; a second acquisition module configured to perform a resolution increase adjustment processing on the video image in any one of the N regions to acquire a resolution-increased video image; and a third acquisition module configured to cut, according to the information of the region where the resolution-increased video image is located, the resolution-increased video image to obtain an image which is located in the region where the resolution-increased video image is located after the cutting.

In the device, the first acquisition module includes: a processing sub-module configured to perform a sampling processing on the N original video images.

In the device, the second acquisition module includes: a first acquisition sub-module configured to acquire the amplification parameter of the video image in any one of the N regions; and a second acquisition sub-module configured to perform a resolution increase adjustment processing on the video image in a corresponding region according to the amplification parameter to obtain a resolution-increased video image.

In the device, the first acquisition sub-module includes: a first acquisition unit configured to acquire an instruction carrying the information about amplification rate of the video image in a region; and a second acquisition unit configured to acquire the amplification parameter of the video image in a corresponding region according to the information about amplification rate in the instruction.

In the device, the first acquisition unit includes: a first acquisition sub-unit configured to acquire, when a touch and amplify operation on the video image in a region is detected, an instruction carrying the information about amplification rate of the video image in a corresponding region according to the touch and amplify operation, or a second acquisition sub-unit configured to acquire, when the selection of an option of amplification on the operation menu of the video image in a region is detected, an instruction carrying the information about amplification rate of the video image in a corresponding region.

In the device, the second acquisition unit includes: a third acquisition sub-unit configured to amplify the video image in a corresponding region according to the amplification parameter to obtain the resolution of the amplified image, wherein the resolution of the amplified image is smaller than that of a corresponding original video image; a fourth acquisition sub-unit configured to acquire the information about lost pixels according to the resolution of the amplified image; and a fifth acquisition sub-unit configured to acquire, according to the information of the lost pixels, the lost pixels from corresponding positions of a pre-stored original video image corresponding to the amplified image so as to acquire a resolution-increased video image.

In the device, the second acquisition unit further includes: a sixth acquisition sub-unit configured to acquire the movement track information of the resolution-increased video image; and a translation sub-unit configured to translate the resolution-increased video image according to the movement track information.

In the device, the sixth acquisition sub-unit includes: a third acquisition unit configured to acquire, when the performance of a 'touch-and-move' operation on the resolution-increased video image is detected, the movement track information of the resolution-increased video image according to the touch-and-move operation; or a fourth acquisition unit configured to acquire, when the selection of an option of movement track on the operation menu of the resolution-increased video image is detected, the movement track information of the resolution-increased video image.

According to another aspect of the present application, a multipoint control unit is also provided in an embodiment of the present disclosure, wherein the multipoint control unit includes the foregoing device for adjusting and controlling a sub-picture in multiple pictures.

Embodiments of the present disclosure have the following beneficial effects: by moving a sub-picture in multiple pictures and increasing the resolution of the sub-picture in the region where the sub-picture is located, the method provided herein for adjusting and controlling a sub-picture in multiple pictures enables a user to check a region of interest which is included in a sub-picture in the region where the sub-picture is located on the premise of causing no influence to the other sub-pictures.

DETAILED DESCRIPTION OF THE EMBODIMENTS

The objects, technical solutions and advantages of embodiments of the present disclosure will be more readily apparent from the following detailed description of the present disclosure when read in conjunction with appended claims and specific embodiments.

Figure 1:
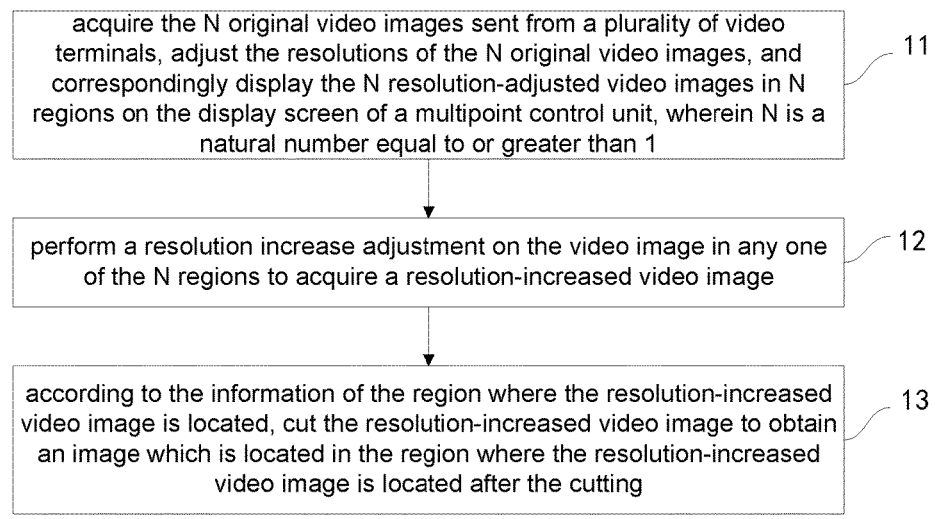
FIG. 1 is a flowchart 1 of a method for adjusting and controlling a sub-picture in multiple pictures according to an embodiment of the present disclosure.

As shown in FIG. 1, a method for adjusting and controlling a sub-picture in multiple pictures is provided in an embodiment of the present disclosure, which includes the following steps:

Step 11: acquiring the N original video images sent from a plurality of video terminals, adjusting the resolutions of the N original video images, and correspondingly displaying the N resolution-adjusted video images in N regions on the display screen of a multipoint control unit, wherein N is a natural number equal to or greater than 1;

Step 12: performing a resolution increase adjustment processing on the video image in any one of the N regions to acquire a resolution-increased video image; and Step 13: cutting, according to the information of the region where the resolution-increased video image is located, the resolution-increased video image to obtain an image which is located in the region where the resolution-increased video image is located after the cutting.

In certain embodiments, in Step 11, adjusting the resolutions of the N original video images includes: performing a sampling processing on the N original video images.

Figure 2:
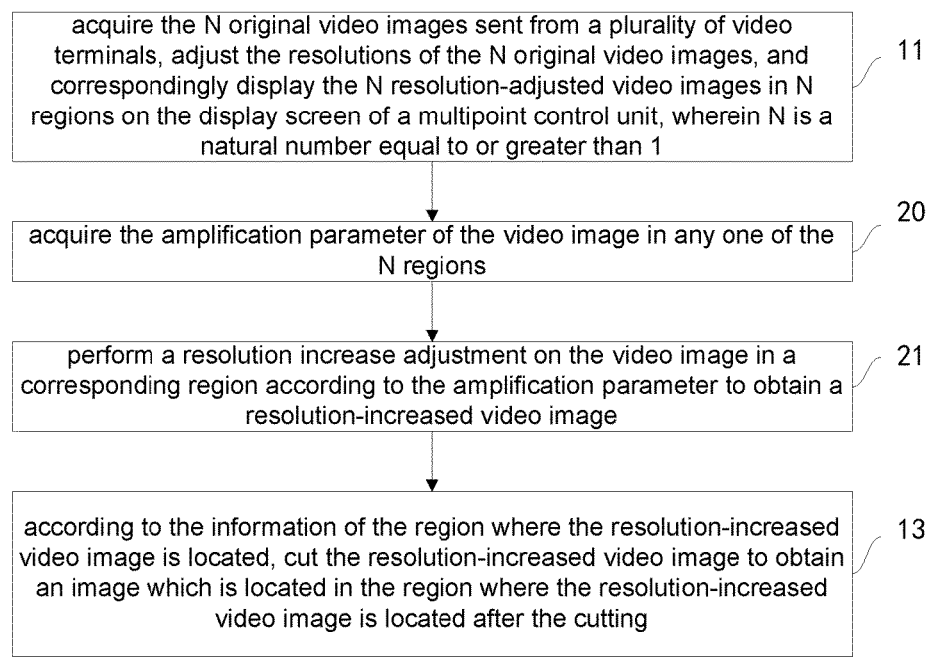
FIG. 2 is a flowchart 2 of a method for adjusting and controlling a sub-picture in multiple pictures according to an embodiment of the present disclosure.

As shown in FIG. 2, Step 12 includes the following steps:

Step 20: acquiring the amplification parameter of the video image in any one of the N regions; and Step 21: performing a resolution increase adjustment on the video image in a corresponding region according to the amplification parameter to obtain a resolution-increased video image.

Figure 3:
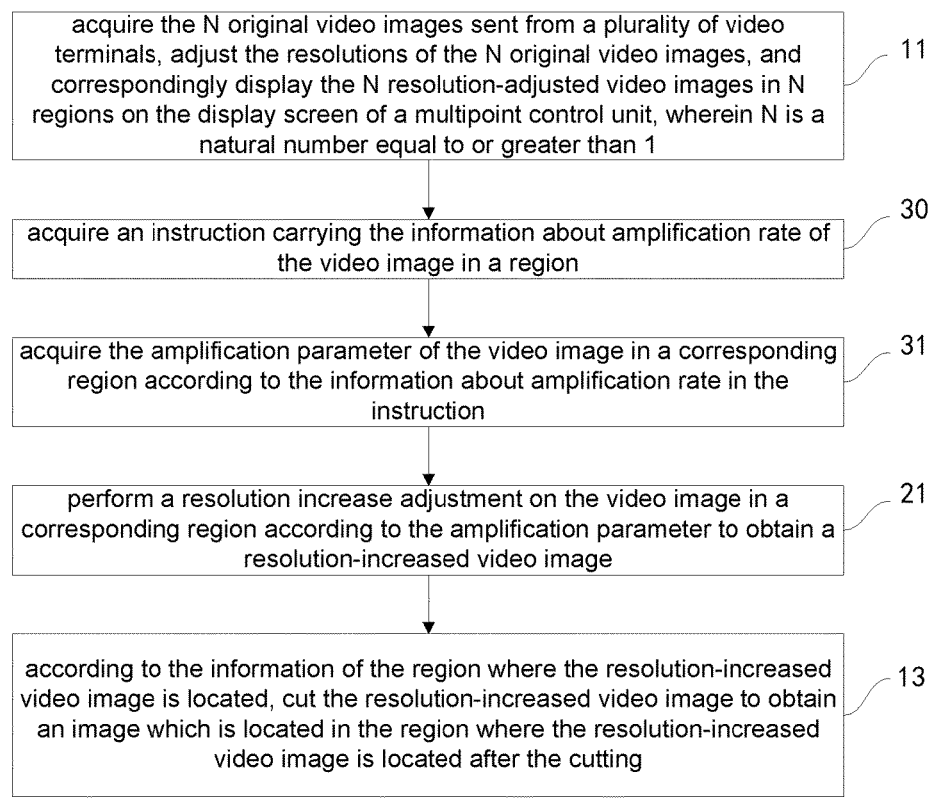
FIG. 3 is a flowchart 3 of a method for adjusting and controlling a sub-picture in multiple pictures according to an embodiment of the present disclosure.

As shown in FIG. 3, Step 20 includes the following steps:

Step 30: acquiring an instruction carrying the information about amplification rate of the video image in a region; and Step 31: acquiring the amplification parameter of the video image in a corresponding region according to the information about amplification rate in the instruction.

In certain embodiments, Step 30 includes the following steps:

acquiring, when a touch and amplify operation on the video image in a region is detected, an instruction carrying the information about amplification rate of the video image in a corresponding region according to the touch and amplify operation; or acquiring, when the selection of an option of amplification on the operation menu of the video image in a region is detected, an instruction carrying the information about amplification rate of the video image in a corresponding region.

Figure 4:
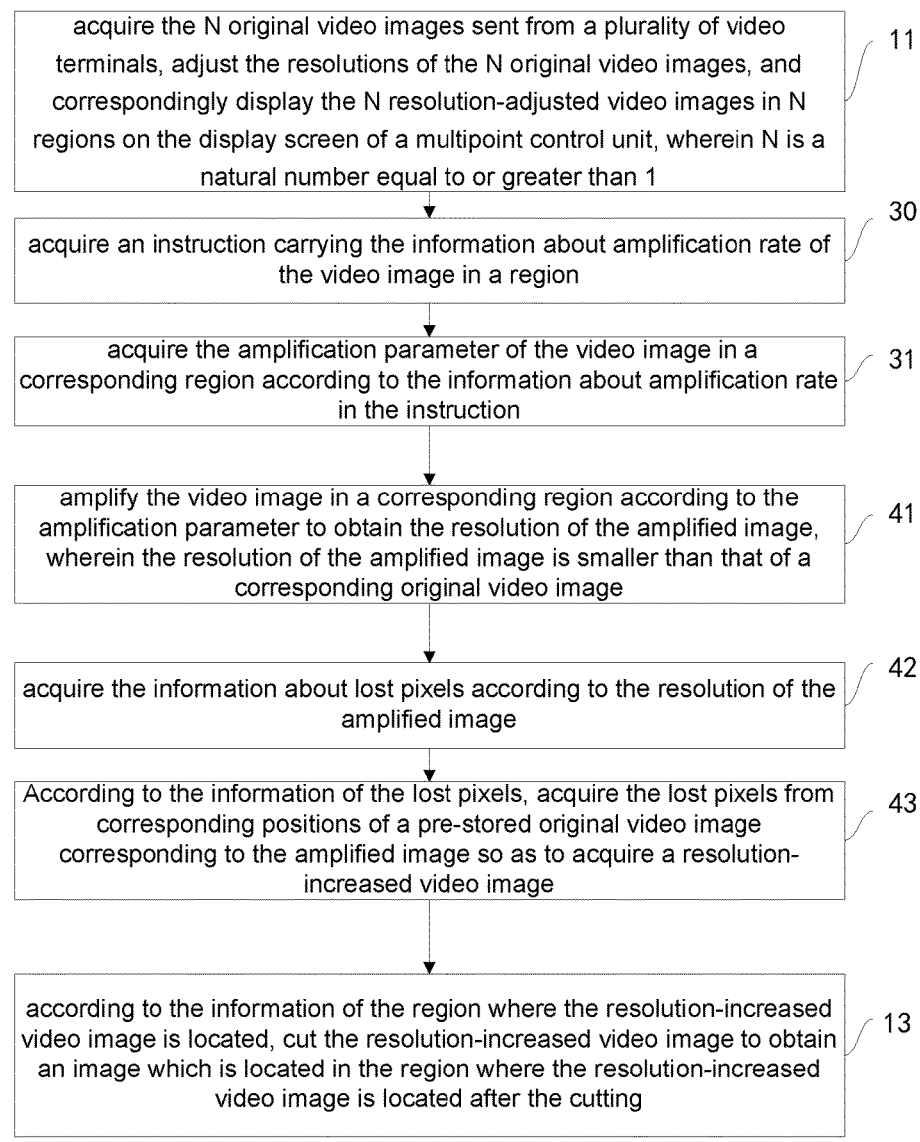
FIG. 4 is a flowchart 4 of a method for adjusting and controlling a sub-picture in multiple pictures according to an embodiment of the present disclosure.

As shown in FIG. 4, Step 21 includes the following steps:

Step 41: amplifying the video image in a corresponding region according to the amplification parameter to obtain the resolution of the amplified image, wherein the resolution of the amplified image is smaller than that of a corresponding original video image;

Step 42: acquiring the information about lost pixels according to the resolution of the amplified image; and Step 43: acquiring, according to the information of the lost pixels, the lost pixels from corresponding positions of a pre-stored original video image corresponding to the amplified image so as to acquire a resolution-increased video image.

Figure 5:
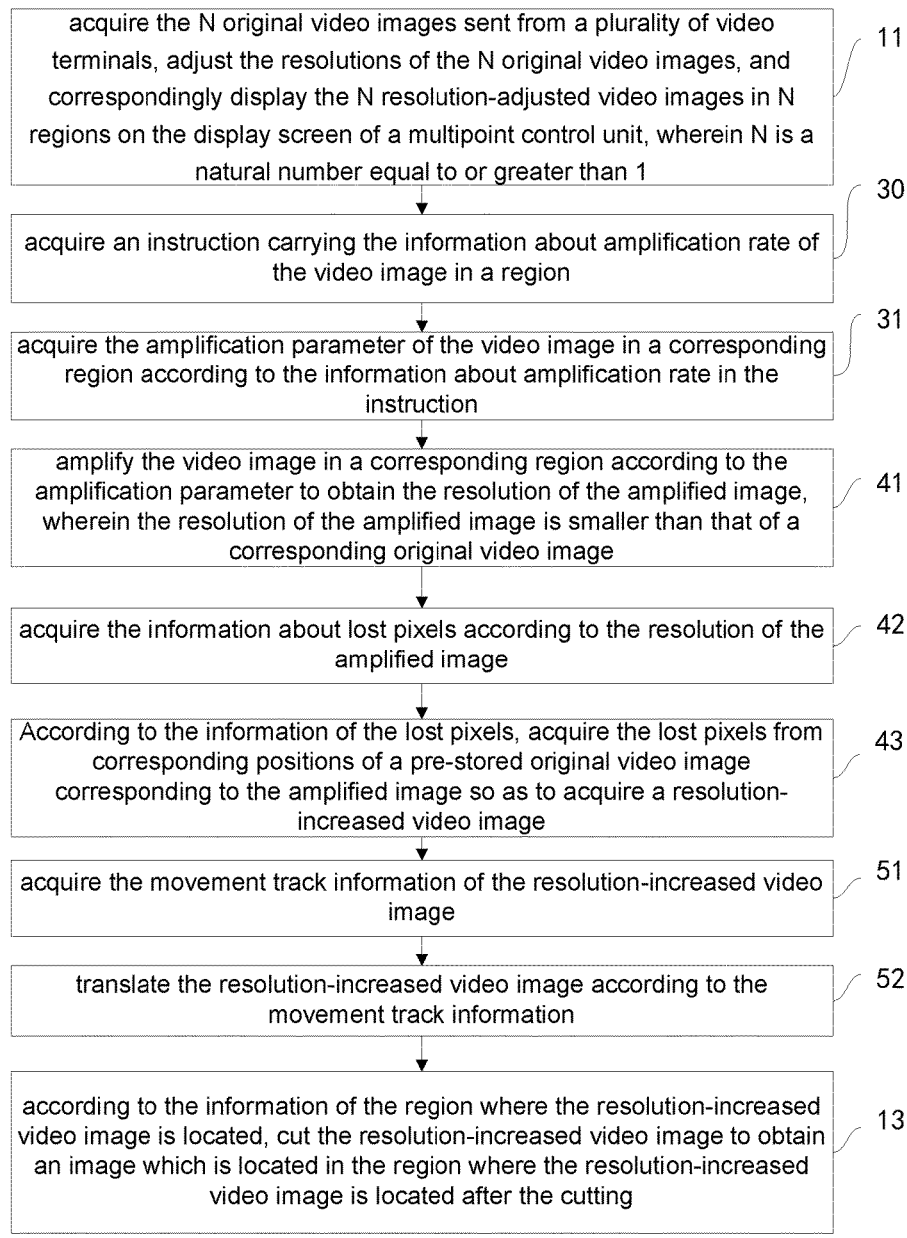
FIG. 5 is a flowchart 5 of a method for adjusting and controlling a sub-picture in multiple pictures according to an embodiment of the present disclosure.

As shown in FIG. 5, the following steps 43 are also included after Step 43:

Step 51: acquiring the movement track information of the resolution-increased video image; and Step 52: translating the resolution-increased video image according to the movement track information.

In certain embodiments, Step 51 includes the following steps:

when a touch-and-move operation on the resolution-increased video image is detected, acquiring the movement track information of the resolution-increased video image according to the touch-and-move operation; or when the selection of an option of movement track on the operation menu of the resolution-increased video image is detected, acquiring the movement track information of the resolution-increased video image.

The foregoing Steps 11 to 13 will be described below in detail with reference to specific embodiments.

When a video conference starts, a plurality of conference participant terminals encode and send a video image, these video images are sent to an MCU, the MCU performs a multi-picture synthesis on the video images sent from the conference participant terminals and places the video images sent from the conference participant terminals in various multi-picture layouts. In a video conference, if a certain terminal desires to check, while viewing multiple pictures (the pictures may be video images), the details of a portion of a certain sub-picture merely by amplifying the sub-picture and moving the sub-picture to a region of interest in the region where the sub-picture is located without amplifying the whole size of the multiple pictures or changing the layout of the multiple pictures, that is, a certain terminal desires to check the details of a portion of a certain sub-picture while viewing multiple pictures by performing an action which causes no influence to the other sub-pictures, then the solution provided in embodiments of the present disclosure is a perfect terminator to this problem.

Figure 6:
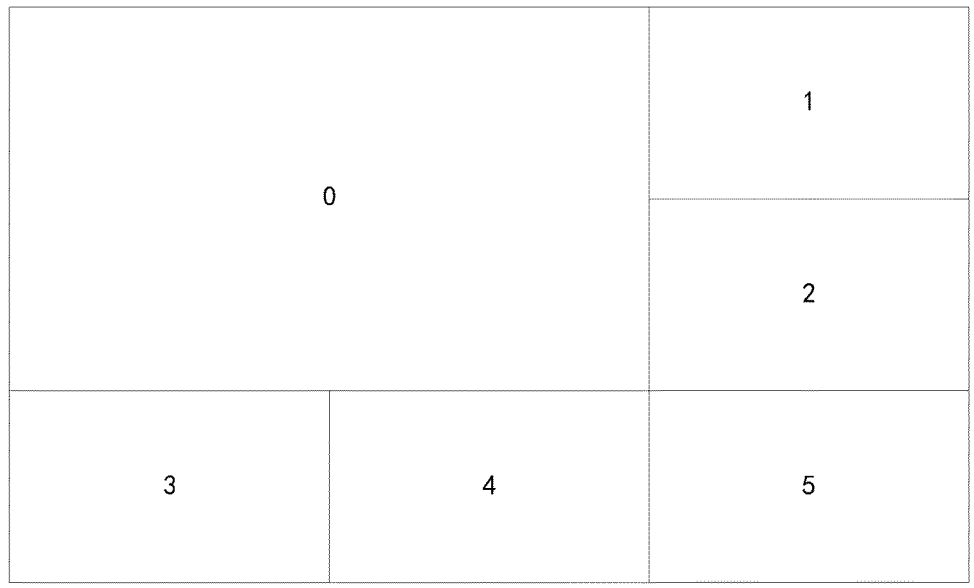
FIG. 6 shows a multi-picture image synthesized by an MCU according to a specific embodiment of the present disclosure.

Assuming that a plurality of conference participant terminals (video terminals) encode and send 6 original video images, the 6 original video images are sent to an MCU, the MCU performs a multi-picture synthesis on the 6 original video images, specifically, the MCU adjusts the resolutions of the 6 original video images, generally, performs a sampling processing on the 6 original video images, at this time, the resolutions of the 6 original video images are decreased, and in a specific embodiment of the present disclosure, the MCU displays the 6 resolution-decreased original video images in 6 non-overlapped regions on the display screen of the MCU (regions may be overlapped, however, a specific embodiment of the present disclosure is based on an example of non-overlapped regions). In a specific embodiment of the present disclosure, the six regions may be divided as follows: according to the areas the six resolution-decreased video images occupy in a picture presented on the display screen of the MCU, the MCU divides the picture presented by the display screen thereof into, for example, the six non-overlapped regions shown in FIG. 6.

Figure 7:
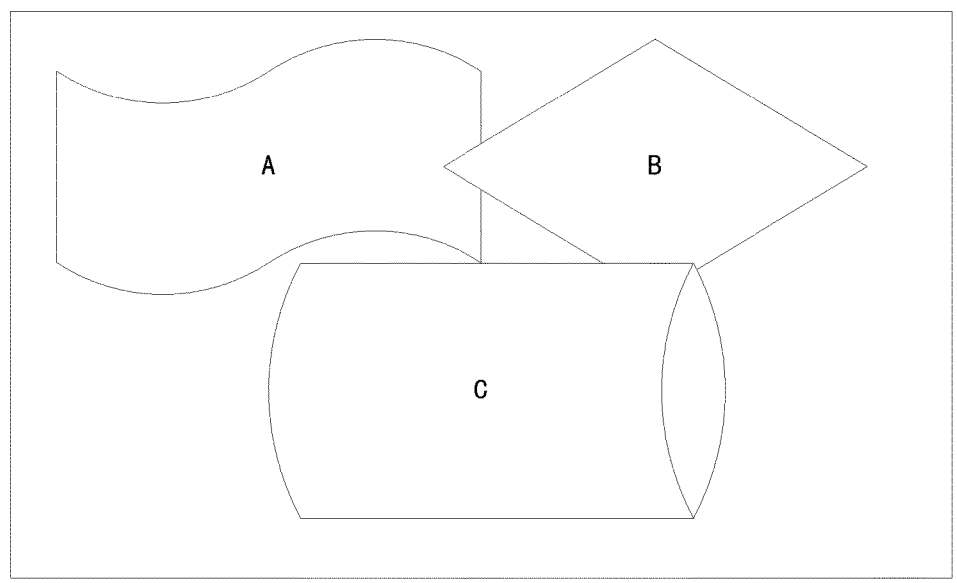
FIG. 7 shows an original video image sent by a conference participant terminal.
Figure 8:
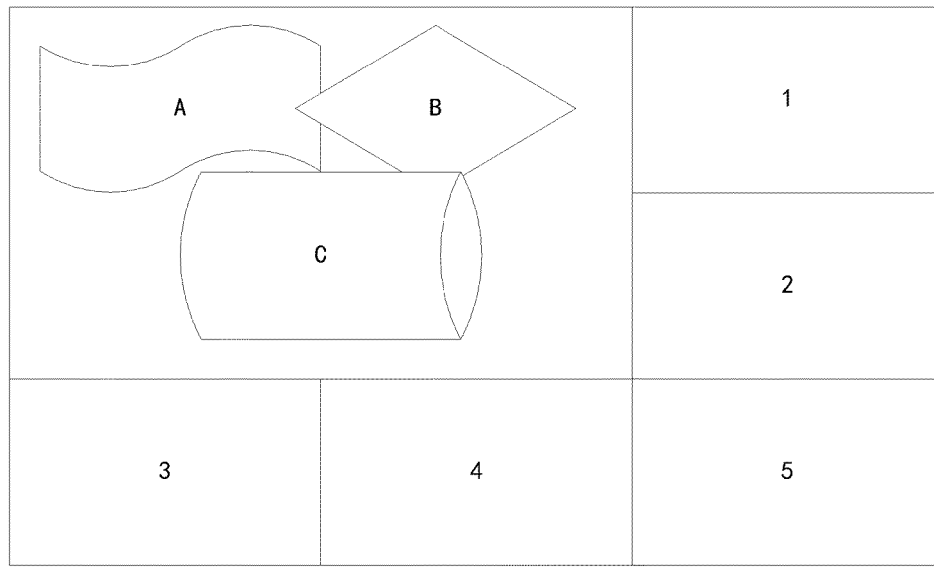
FIG. 8 shows the effect of the display of the original video images shown in FIG. 7 and processed by an MCU in a plurality of images.

Assuming that a video image obtained by decreasing the resolutions of the original video images shown in FIG. 7 is displayed in a region 0, as shown in FIG. 8; if a terminal desires to check the details of a portion of the video image in the region 0, because the video image in the region 0 is a video image obtained by decreasing the resolutions of the original video images, this overall resolution decrease mode causes the loss of pixels and therefore causes the loss of plenty of details, making the resulting video image seem not real and clear enough; if a certain conference participant terminal desires to check the details of a certain part of the video image in region 0 which is corresponding to the original video images shown in FIG. 7, then the video image in the region 0 can be amplified and moved into a region of interest, and the specific processing of the MCU is as follows:

First, an instruction carrying the information about amplification rate of the video image in the region 0 is acquired;

The instruction can be acquired in at least the following two ways: way 1: when a touch and amplify operation on the video image in the region 0 is detected, the instruction is acquired according to the touch and amplify operation, wherein the amplification rate of the video image in the region 0 is carried in the instruction; and way 2: the instruction is acquired when the selection of an option of amplification on the operation menu of the video image in the region 0 is detected.

Then, the MCU generates an amplification parameter in real time according to the information about amplification rate in the instruction after acquiring the instruction.

Sequentially: the MCU performs a resolution increase adjustment processing on the video image in the region 0 according to the amplification parameter to obtain a resolution-increased video image, and specifically, this flow is as follows:

(1): the video image in the region 0 is amplified according to the amplification parameter to obtain the resolution of the amplified image, wherein the resolution of the amplified image is smaller than that of a corresponding original video image;

(2): the information about lost pixels is acquired according to the resolution of the amplified image; and (3): the lost pixels are acquired from corresponding positions of a pre-stored original video image corresponding to the amplified image according to the information of the lost pixels so as to acquire a resolution-increased video image.

Last, assuming that the resolution-increased video image is cut according to the region 0, an image is obtained which is located in the region 0 after the cutting.

Assuming that the details of an image portion the conference participant terminal desires to check are in the region 0, the resolution-increased video image is directly cut to obtain the details of an image portion which are located in the region 0 after the cutting.

Assuming that the detailed image portion a conference participant terminal desires to check is not in the region 0, the following steps may also be executed:

1): the movement track information of the resolution-increased video image is acquired;

the movement track information can be acquired in at least the following two ways: way 1: when a touch-and-move operation on the resolution-increased video image is detected, the movement track information of the resolution-increased video image is acquired according to the touch-and-move operation, or the movement track information of the resolution-increased video image is acquired when the selection of an option of movement track on the operation menu of the resolution-increased video image is detected;

2) the resolution-increased video image is translated according to the movement track information until the detailed image portion the conference participant terminal desires to check is in the region 0, then the resolution-increased video image is cut to obtain the detailed image portion which is located in the region 0 after the cutting.

Of course, if the detailed image portion the conference participant terminal desires to check is still not in the region 0 after the foregoing steps (1), (2) and (3) and steps 1) and 2) are executed, then a new amplification parameter is acquired and the foregoing steps (1), (2) and (3) and steps 1) and 2) are executed repeatedly until the detailed image portion the conference participant terminal desires to check is in the region 0.

Figure 9:
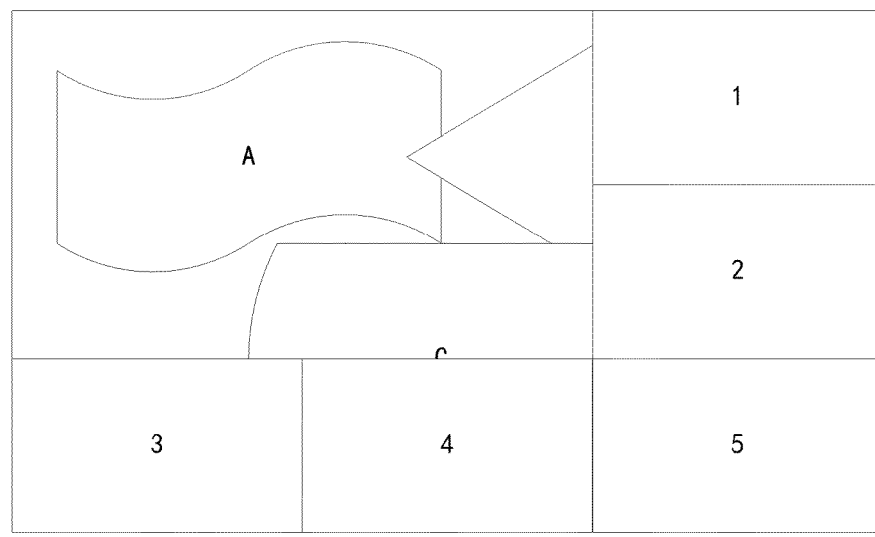
FIG. 9 is a schematic diagram illustrating the display of a region A after the video image shown in a region 0 in FIG. 8 is increased in resolution and moved.
Figure 10:
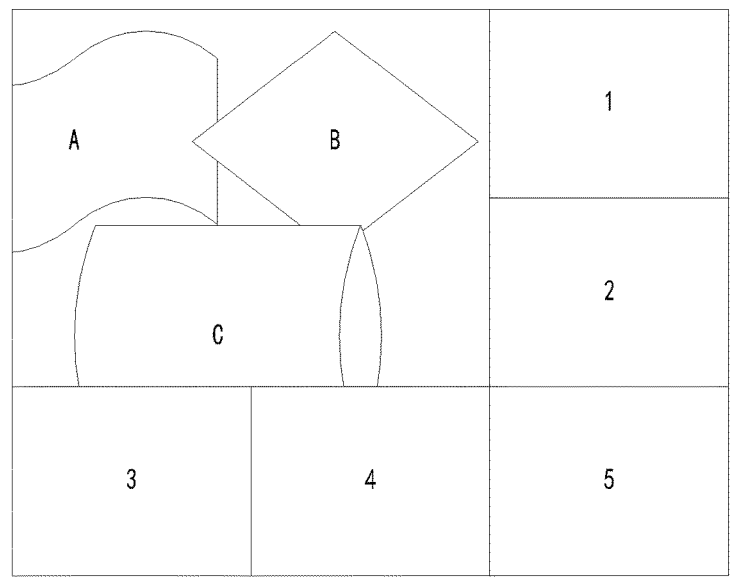
FIG. 10 is a schematic diagram illustrating the display of a region B after the video image shown in a region 0 in FIG. 8 is increased in resolution and moved.

FIG. 9 shows the image of a desired detailed part (A) obtained by amplifying the resolution of the video image in the region 0 and moving the video image, FIG. 10 shows the image of a desired detailed part (B) obtained by amplifying the resolution of the video image in the region 0 and moving the video image, apparently, the image of another detailed part can be obtained by amplifying the resolution of the video image in the region 0 and moving the video image, and related processing is not described here repeatedly.

In conclusion, the solutions provided in embodiments of the present disclosure only require the performance of an action of amplifying the video image in a corresponding region in the region and moving the video image to a region of interest, causing no effect to the video images in the other regions.

Figure 11:
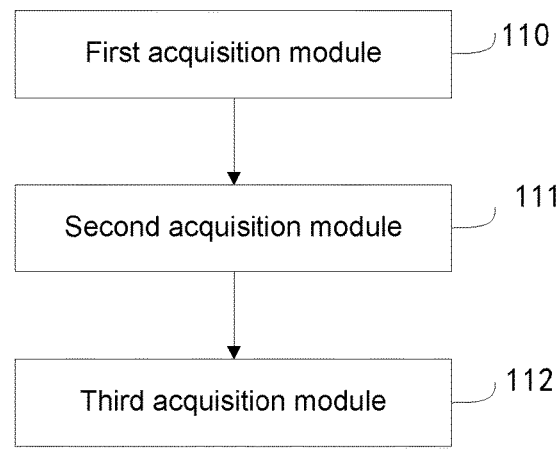
FIG. 11 is a schematic diagram 1 illustrating the structure of a device for adjusting and controlling a sub-picture in multiple pictures according to an embodiment of the present disclosure.

As shown in FIG. 11, a device for adjusting and controlling a sub-picture in multiple pictures provided in an embodiment of the present disclosure includes:

a first acquisition module 110 configured to acquire the N original video images sent from a plurality of video terminals, adjust the resolutions of the N original video images and correspondingly display the N resolution-adjusted video images in N regions on the display screen of a multipoint control unit, wherein N is a natural number equal to or greater than 1;

a second acquisition module 111 configured to perform a resolution increase adjustment processing on the video image in any one of the N regions to acquire a resolution-increased video image; and a third acquisition module 112 configured to cut, according to the information of the region where the resolution-increased video image is located, the resolution-increased video image to obtain an image which is located in the region where the resolution-increased video image is located after the cutting.

In the device, the first acquisition module 110 includes:

a processing sub-module configured to perform a sampling processing on the N original video images.

Figure 12:
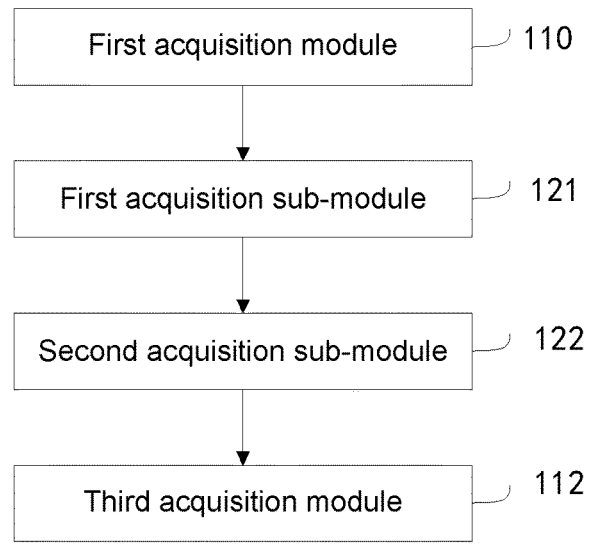
FIG. 12 is a schematic diagram 2 illustrating the structure of a device for adjusting and controlling a sub-picture in multiple pictures according to an embodiment of the present disclosure.

In the device, as shown in FIG. 12, the second acquisition module 111 includes:

a first acquisition sub-module 121 configured to acquire the amplification parameter of the video image in any one of the N regions; and a second acquisition sub-module 122 configured to perform a resolution increase adjustment on the video image in a corresponding region according to the amplification parameter to obtain a resolution-increased video image.

Figure 13:
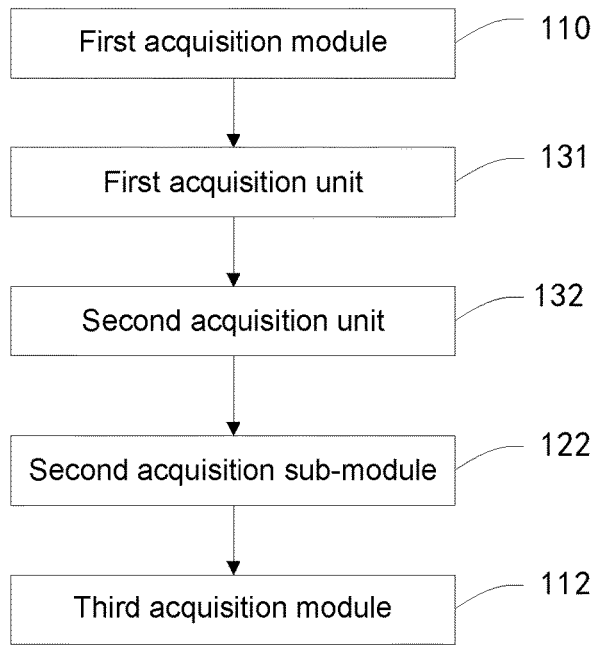
FIG. 13 is a schematic diagram 3 illustrating the structure of a device for adjusting and controlling a sub-picture in multiple pictures according to an embodiment of the present disclosure.

In the device, as shown in FIG. 13, the first acquisition sub-module 121 includes:

a first acquisition unit 131 configured to acquire an instruction carrying the information about amplification rate of the video image in a region; and a second acquisition unit 132 configured to acquire the amplification parameter of the video image in a corresponding region according to the information about amplification rate in the instruction.

In the device, the first acquisition unit 131 includes:

a first acquisition sub-unit configured to acquire, when a touch and amplify operation on the video image in a region is detected, an instruction carrying the information about amplification rate of the video image in a corresponding region according to the touch and amplify operation; or a second acquisition sub-unit configured to acquire, when the selection of an option of amplification on the operation menu of the video image in a region is detected, an instruction carrying the information about amplification rate of the video image in a corresponding region.

Figure 14:
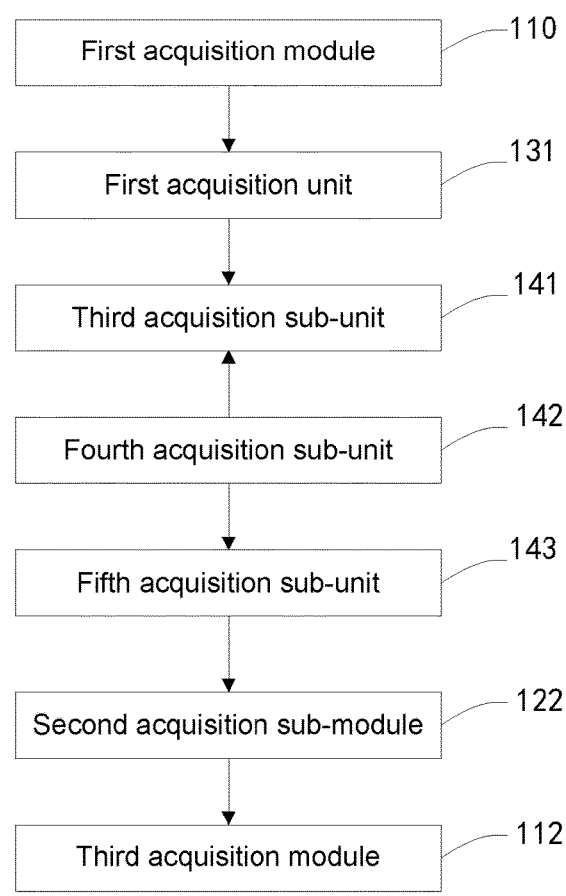
FIG. 14 is a schematic diagram 4 illustrating the structure of a device for adjusting and controlling a sub-picture in multiple pictures according to an embodiment of the present disclosure.

In the device, as shown in FIG. 14, the second acquisition unit 132 includes:

a third acquisition sub-unit 141 configured to amplify the video image in a corresponding region according to the amplification parameter to obtain the resolution of the amplified image, wherein the resolution of the amplified image is smaller than that of a corresponding original video image;

a fourth acquisition sub-unit 142 configured to acquire the information about lost pixels according to the resolution of the amplified image; and a fifth acquisition sub-unit 143 configured to acquire, according to the information of the lost pixels, the lost pixels from corresponding positions of a pre-stored original video image corresponding to the amplified image so as to acquire a resolution-increased video image.

Figure 15:
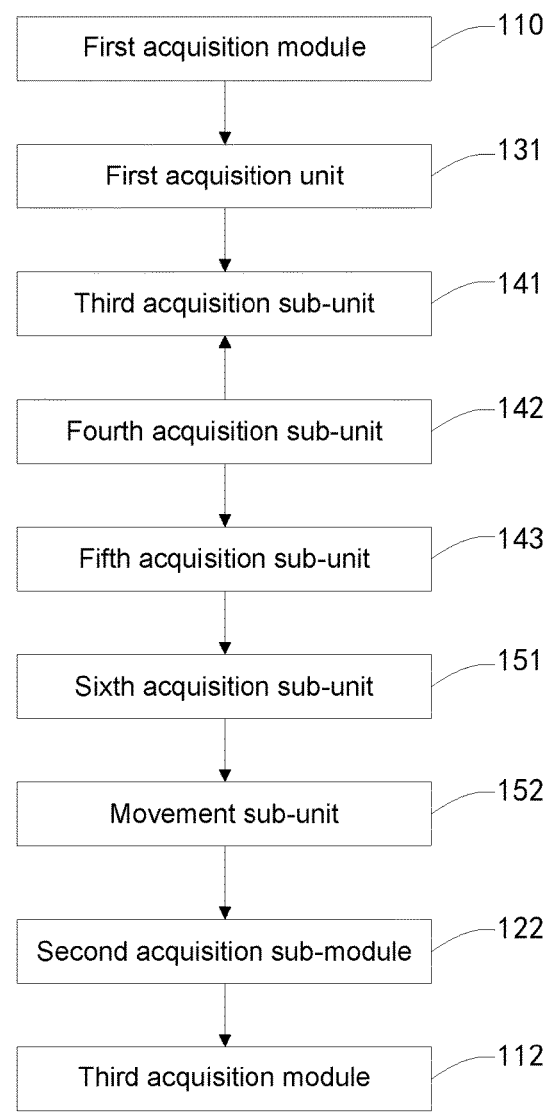
FIG. 15 is a schematic diagram 5 illustrating the structure of a device for adjusting and controlling a sub-picture in multiple pictures according to an embodiment of the present disclosure.

In the device, as shown in FIG. 15, the second acquisition unit 132 further includes:

a sixth acquisition sub-unit 151 configured to acquire the movement track information of the resolution-increased video image; and a translation sub-unit 152 configured to translate the resolution-increased video image according to the movement track information.

In the device, the sixth acquisition unit 151 includes:

a third acquisition unit configured to acquire, when a touch-and-move operation on the resolution-increased video image is detected, the movement track information of the resolution-increased video image according to the touch-and-move operation; or a fourth acquisition unit configured to acquire, when the selection of an option of movement track on the operation menu of the resolution-increased video image is detected, the movement track information of the resolution-increased video image.

It should be noted that the device is a device corresponding to the foregoing method embodiments, and the implementation modes described in the foregoing method embodiments, when applied to embodiments of the device, can also achieve the same technical effects.

A multipoint control unit is also provided in an embodiment of the present disclosure, wherein the multipoint control unit includes the foregoing device for adjusting and controlling a sub-picture in multiple pictures.

It should be noted that the multipoint control unit is a multipoint control unit including the foregoing device, and the implementation modes described in the embodiments of the foregoing device, when applied to embodiments of the multipoint control unit, can also achieve the same technical effects.

Although exemplary embodiments of the present are described above, it should be noted that a variety of improvements and modifications can be devised by those of ordinary skill in the art and that such improvements and modifications should fall within the scope of the protection of the present disclosure.

INDUSTRIAL APPLICABILITY

As stated above, in the foregoing embodiments and exemplary implementation modes, a sub-picture in multiple pictures is moved and increased in resolution in the region where the sub-picture is located, thus, a user can view a region of interest that is included in the sub-picture in the region where the sub-picture is located without affecting the other sub-pictures.

What is claimed is:

1. A method for adjusting and controlling a sub-picture in multiple pictures, comprising:
acquiring N original video images sent from a plurality of video terminals, adjusting resolutions of the N original video images and correspondingly displaying N video images in N regions on a display screen of a multipoint control unit, wherein N is a natural number equal to or greater than 1;
performing a resolution increase adjustment processing on a video image in any one of the N regions to acquire a resolution-increased video image; and
cutting, according to information of a region where the resolution-increased video image is located, the resolution-increased video image to obtain an image which is located in the region where the resolution-increased video image is located;
wherein the step of performing a resolution increase adjustment processing on the video image in any one of the N regions to acquire a resolution-increased video image comprises:
acquiring an amplification parameter of the video image in any one of the N regions; and
performing a resolution increase adjustment processing on the video image in a corresponding region according to the amplification parameter to obtain a resolution-increased video image;
wherein the step of acquiring the amplification parameter of the video image in any one of the N regions comprises:
acquiring an instruction carrying information about amplification rate of the video image in a region; and
acquiring the amplification parameter of the video image in a corresponding region according to the information about amplification rate in the instruction;
wherein the step of performing a resolution increase adjustment processing on the video image in a corresponding region according to the amplification parameter to obtain a resolution-increased video image comprises:
amplifying the video image in a corresponding region according to the amplification parameter, and obtaining the resolution of the amplified image, wherein the resolution of the amplified image is smaller than that of a corresponding original video image;
acquiring information about lost pixels according to the resolution of the amplified image; and
acquiring, according to the information about the lost pixels, lost pixels from corresponding positions of a pre-stored original video image corresponding to the amplified image so as to acquire a resolution-increased video image.

2. The method according to claim 1, wherein the step of adjusting the resolutions of the N original video images comprises:
performing a sampling processing on the N original video images.

3. The method according to claim 1, wherein the step of acquiring an instruction carrying the information about amplification rate of the video image in a region comprises:
when a touch and amplify operation on the video image in a region is detected, acquiring an instruction carrying the information about amplification rate of the video image in a corresponding region according to the touch and amplify operation; or when a selection of an option of amplification on an operation menu of the video image in a region is detected, acquiring an instruction carrying the information about amplification rate of the video image in a corresponding region.

4. The method according to claim 1, wherein after the step of acquiring the resolution-increased video image, the method further comprises:

acquiring movement track information of the resolution-increased video image; and translating the resolution-increased video image according to the movement track information.

5. The method according to claim 4, wherein the step of acquiring the movement track information of the resolution-increased video image comprises:

when a touch-and-move operation on the resolution-increased video image is detected, acquiring the movement track information of the resolution-increased video image according to the touch-and-move operation; or when a selection of an option of movement track on the operation menu of the resolution-increased video image is detected, acquiring the movement track information of the resolution-increased video image.

6. A device for adjusting and controlling a sub-picture in multiple pictures, comprising:

a first acquisition module, configured to acquire N original video images sent from a plurality of video terminals, adjust resolutions of the N original video images and correspondingly display the N resolution-adjusted video images in N regions on a display screen of a multipoint control unit, wherein N is a natural number equal to or greater than 1;

a second acquisition module, configured to perform a resolution increase adjustment processing on the video image in any one of the N regions to acquire a resolution-increased video image; and a third acquisition module, configured to cut, according to information of the region where the resolution-increased video image is located, the resolution-increased video image to obtain an image which is located in the region where the resolution-increased video image is located;

wherein a second acquisition module is further configured to:

acquire an instruction carrying information about amplification rate of the video image in a region;

acquire the amplification parameter of the video image in a corresponding region according to the information about amplification rate in the instruction;

amplify the video image in a corresponding region according to the amplification parameter, and obtain the resolution of the amplified image, wherein the resolution of the amplified image is smaller than that of a corresponding original video image;

acquire information about lost pixels according to the resolution of the amplified image; and acquire, according to the information about the lost pixels, lost pixels from corresponding positions of a pre-stored original video image corresponding to the amplified image so as to acquire a resolution-increased video image.

7. A multipoint control unit, comprising the device for adjusting and controlling a sub-picture in multiple pictures as claimed in claim 6.

* * * * *